(12) United States Patent
Coleman

(10) Patent No.: US 7,165,296 B2
(45) Date of Patent: Jan. 23, 2007

(54) FLEXIBLE MATERIAL TRI-WEDGE BAR AND CLAMP ASSEMBLY FOR USE WITH A TENSIONING DEVICE

(76) Inventor: Kelly R. Coleman, 516 Belle Isle Ave., Belleair Beach, FL (US) 34635

( * ) Notice: Subject to any disclaimer, the term of this patent is extended or adjusted under 35 U.S.C. 154(b) by 0 days.

(21) Appl. No.: 11/118,448

(22) Filed: May 2, 2005

(65) Prior Publication Data
US 2006/0242805 A1 Nov. 2, 2006

(51) Int. Cl.
*A44B 11/25* (2006.01)
*G09F 17/00* (2006.01)

(52) U.S. Cl. .................................................. 24/462

(58) Field of Classification Search .............. 160/271, 160/327, 328, 368.1, 378, 391, 392, 380, 160/395; 24/581.11, 459, 462; 40/603, 40/604, 156, 549; 52/202, 203, 222, 273, 52/716–718, 410, 465, 468, 710
See application file for complete search history.

(56) References Cited

U.S. PATENT DOCUMENTS

| | | | | |
|---|---|---|---|---|
| 3,205,547 A | * | 9/1965 | Riekse ...................... | 24/462 |
| 4,788,806 A | * | 12/1988 | Sease ....................... | 52/222 |
| 4,920,714 A | * | 5/1990 | Sease ....................... | 52/222 |
| 4,937,961 A | * | 7/1990 | Gandy et al. .............. | 40/603 |
| 4,980,934 A | * | 1/1991 | Dahowski et al. .......... | 4/496 |
| 5,380,120 A | * | 1/1995 | Vermeulen ................. | 52/63 |
| 5,398,388 A | * | 3/1995 | Coleman .................. | 24/593.11 |
| 5,467,546 A | * | 11/1995 | Kovalak, Jr. ............... | 40/603 |
| 5,647,155 A | * | 7/1997 | Hillstrom .................. | 40/603 |

* cited by examiner

*Primary Examiner*—Robert J. Sandy
*Assistant Examiner*—Ruth C. Rodriguez
(74) *Attorney, Agent, or Firm*—Ronald E. Greigg (57) ABSTRACT

Flexible material clamp discloses two parts, triangular bar and rigid clamp having congruent triangular channel. The bar has base and two major inclined surfaces meeting at acute angle, length of the major surfaces being at least three times base height. Clamp has internal triangular channel whose major surfaces are congruent to major surfaces of triangular bar. One clamp end opens into apex of the channel and at least one side of clamp opens to triangular channel. One end of flexible material to be clamped is wrapped about triangular bar and overlapped upon itself. The wrapped bar is inserted into clamp channel though the at least one open side of clamp and flexible material is passed through clamp opening at channel apex. Assembled wrapped bar and clamp connect to tensioning means causing clamp and bar to move relative to one another to lock flexible material between major surfaces of triangular bar and corresponding major surfaces of triangular clamp channel, locking flexible material in channel.

20 Claims, 5 Drawing Sheets

FLEXIBLE MATERIAL TRI-WEDGE BAR AND CLAMP ASSEMBLY FOR USE WITH A TENSIONING DEVICE

BACKGROUND OF THE INVENTION

1. Field of the Invention

The invention relates to a clamp assembly for releasable securing a flexible material within the clamp assembly and the use of this clamp assembly to tension or support the flexible material and is particularly useful in the tensioning of flexible material signs, awnings, screens, etc.

2. Description of the Prior Art

This invention is an improvement to the tensioning assembly utilized in Coleman U.S. Pat. No. 5,398,388 to make a sign facing formed of flexible material tight against a sign frame.

It is known in this art to provide a means for securing the edges of flexible material, be it a sign, an awning, a screen, a silkscreen etc., to some form of clip or clamp and then to use the clips with a frame structure to tension the flexible material across the frame. All these clips are provided with some form of cavity that is designed to receive the edge of the flexible material and retain the material therein. In U.S. Pat. No. 2,335,361, the flexible material is physically crimped in the clip channel. Although the material is secured, such physical deformation clearly could damage the flexible material. A number of other patents wrap the flexible material about a bar and use tabs in the clip cavity or use the edges of the clip cavities to secure the wrapped bar within the cavity (see U.S. Pat. No. 4,955,928, U.S. Pat. No. 5,033,216, U.S. Pat. No. 5,398,388 and U.S. Pat. No. 5,467,546). The wrapped bar in each of these instances was secured in the cavity only at the points where the tabs or cavity edges engaged the wrapped bars. In U.S. Pat. No. 4,955,928 the wrapped bar was secured by small outer legs 54 and 42 at the cavity opening. In U.S. Pat. No. 5,033,216 the wrapped bar was secured by prongs 60 and 70 at the rear of the clip. In U.S. Pat. No. 5,398,388 the wrapped bar was secured by leg 36 at the cavity opening. In U.S. Pat. No. 5,467,546 the edge of the flexible material was wrapped about a U-shaped spline, which defined a trough, and the wrapped spline was inserted into the clip cavity which contained detents which snapped into the trough thereby deforming the fabric in the trough. In this manner the fabric margin was grasped or secured in the clip cavity by the detents interaction with the trough. Although the flexible material was secured in the cavity in all these patents, the only physical grip on the flexible material was at very small points or areas on the cavity wall where the wrapped bar was engaged when tensioned. In U.S. Pat. No. 5,467,546, for example, which secured the wrapped bar in the cavity by detents, when the fabric was tensioned, the fabric pulled the wrapped spline to pinch it at a pinch point 24 on only one side of the clip cavity. This means for securing as well as the other prior art, which secure at only small points or areas are substantially different from applicant's means for securing, which secures and locks the flexible material simultaneously to approximately 90% of the cavity's surface. Although the above prior art means for securing grip the fabric in the cavity, they do it in an entirely different manner with an entirely different result.

There are still other patents that describe wrapping the flexible material about a bar and placing the wrapped bar in a clip or clamp cavity. The bars utilized in these patents are in the form of circular, square or elongated bars that are placed in cavities that are complimentary in shape to the bars so that when the fabric is tensioned a larger surface area of the fabric is clamped in the cavity (see U.S. Pat. No. 3,485,165, U.S. Pat. No. 4,265,039, U.S. Pat. No. 4,409,749. U.S. Pat. No. 4,554,754, U.S. Pat. No. 5,042,182, U.S. Pat. No. 5,301,447 and U.S. Pat. No. 6,339,889). Although these references appear to provide a stronger grip on the fabric than the previous references, the grip was only either a portion of an arc of a circle, one side of a square or two sides of a four side element. In U.S. Pat. No. 4,409,749 a wrapped four sided bar with two tapered sides was placed in a tapered channel. When the fabric was tensioned it was gripped in the channel by the tapered sides of the bar. In U.S. Pat. Nos. 3,485,165, 4,265,039, 4,554,754, 5,042,182, 5,301,447 and 6,339,889 wrapped circular bars were placed in circular channels. When the fabric was tensioned, it was gripped at a small arc of the channel. Reference U.S. Pat. No. 6,339,889 also taught a wrapped rectangular bar placed in a rectangular channel. When the fabric was tensioned, it was gripped at only one side of the rectangular channel.

None of the above cited references teaches wrapping the flexible material about a triangular bar with two major surfaces joined at the apex by an acute angle and whose major surface lengths are at least three times the height of its base and the insertion of the wrapped bar into a clamp channel that has a base and two sloping side walls that are congruent to the sides of the triangular bar within the channel. This latter structure provides an almost 90% gripping surface area for the flexible material, which far exceeds the gripping surface area of the prior art. An even larger gripping surface area could be obtained by further reducing the acute angle of the triangular bar.

In many of the prior art tensioning devices noted above, the entire securing means of the fabric takes place within the clip itself. If the clip fails for whatever reason, and they are known to do so, it could result in slippage of the material from the cavity, severe stress to the material resulting in deformation of the material, and in some instances tearing of the material. Since many of these prior art clips are made from flexible material, particularly in the area where they secure the fabric, when this part of the clip fails, so does its grip on the fabric. For example in U.S. Pat. No. 2,335,361 the fabric margin is secured to the clip by crimping the fabric between two flexible legs. Should either leg break, the fabric will pull free. Similarly in U.S. Pat. No. 5,467,546, the fabric margin is secured to the clip by flexible legs having detents that grasp the fabric margin to the clip. If either of these legs fail, the uniform grip on the fabric is lost and the stress in the fabric will cause slippage of the fabric or, at the very least, distortion of the fabric being tensioned. In U.S. Pat. No. 5,033,216 the fabric retaining clip is made of flexible sheet metal with the fabric margin being retained in the clip by very small prongs. Should this clip fail or just the small prongs of the clip fail, the fabric would slip or deform and the uniform tensioning would be lost.

The present invention's clamping means eliminates all these problems by not only providing a more secure means of internal clip flexible material retention but also additionally providing an external clamping of the flexible material. Applicant's solution to this problem consists of two features. First, the clip or clamp that grasps the marginal edge of the fabric internally of the clip is made of a rigid nonflexible material. Because of this rigidity, it is highly unlikely that the clip itself will fail and loose its grip on the fabric. Additionally applicant's unique triangular internal clamping design provides maximum surface area gripping force on the flexible material. Secondly, in addition to the securely clamping the fabric margin internally of the clip, the fabric margin is extended out of the clip and is additionally externally clamped to the clip receiving channel wall as a result of pivotal movement of the tensioning clip as the fabric is tensioned. In a first embodiment, the fabric margin is wrapped about a triangular bar and secured within the clip with the fabric margin extending out of the clip. As the fabric margin extends from the interior of the clip, it overlaps the main body of the fabric and this double layer of fabric is then clamped between an external edge of the clip and the receiving channel wall when the clip pivots as a result of the fabric tension. In a second embodiment, the fabric margin is wrapped about a triangular bar and secured within the clip with the apex of the wrapped bar extending externally of the clip. Again, as in the first embodiment, as the fabric margin extends from the interior of the clip, it overlaps the main body of the fabric and this double layer of fabric is clamped between an external edge of the clip and the receiving channel wall when the clip pivots as a result of the fabric tension. In one version of this embodiment, however, the apex of the wrapped triangular bar additionally clamps a single layer of the fabric to the receiving channel wall in addition to the double layer clamping when the clip pivots as a result of the fabric tension.

In alternate versions of the above mentioned embodiments, the fabric margin is wrapped about the triangular bar and overlapped upon itself with its free end secured within the clip so that only a single layer of the fabric extends from the interior of the clip. In this alternative to the first embodiment, the single layer is clamped between the external edge of the clip and the receiving channel wall when the clip pivots as a result of the fabric tension. In this alternative to the second embodiment, when the free end of the fabric margin is secured within the clip and a single layer of the fabric extends from the clip, the single layer is clamped between the external edge of the clip and the channel wall. In this embodiment, however, a double layer of fabric is clamped between the apex of the triangular bar and the channel wall upon clip rotation.

The only prior art fabric tensioners that formed any type of external clamping in addition to internally securing the fabric margin within the clip were U.S. Pat. No. 5,255,459 and applicant's own Patent U.S. Pat. No. 5,398,388. In U.S. Pat. No. 5,255,459, only a single layer of fabric is clamped between an external edge of the clip and the receiving channel wall, not the overlapped double layer clamping taught by applicant. Furthermore, this reference fails to teach the unique additional external clamping or locking of the fabric margin between the external portion of the clamp as well as the clamping or locking by the apex of the triangular bar. In addition, this reference also differs from applicant in that it secures a single layer of the fabric within the clip by physically puncturing the fabric to retain it within the clip. There is no internal channel or recess within the clip that interacts in any way with a bar or spline wrapped with the fabric. Although applicant's above noted patent performs a double layer external clamping, it does not employ the novel and efficient internal clip clamping achieved by the triangular shaped bar of all the embodiments of the present invention nor does it teach the additional external clamping between the triangular bar apex and the receiving channel wall of one of the embodiments.

SUMMARY OF THE INVENTION

Accordingly, it is an object of the present invention to provide an improved clamp assembly for retaining a flexible material in a cavity with maximum gripping properties while applying minimal strain on the flexible material.

Another object of this invention is the utilization of a triangular bar in combination with a rigid nonflexibleclamp having a triangular channel to secure a flexible material wound about the triangular bar within the channel. When the wrapped bar is inserted in the triangular channel, the flexible material is passed outside the clamp through the apex of its channel. When tension is applied to the flexible material tending to pull it out of the clamp channel or when the clamp body is drawn in the opposite direction, the triangular bar will be drawn toward the apex of the channel with its major surfaces contacting the major surfaces of the channel. As it is so drawn, a gripping force is applied gradually and distributed evenly to the flexible material wrapped about the bar at every point on the major surfaces of the triangular bar. The major surfaces of the triangular bar distribute the tensile force to the major surfaces of the channel in the same manner as an inclined plane. That is, when a force acts on the triangular bar along a line from its apex to the center of its base, as would happen when tension is applied to the flexible material or when an opposite force is applied to the clamp body, this force would be distributed perpendicularly throughout the entire surface area of the bar's major surfaces toward the adjacent walls of the clamp channel resulting in a smooth application of the gripping force with minimal pulling on the material. This is especially important for flexible material that could be subject to tearing or deformation. The use of this triangular bar and triangular clamp channel provide outstanding hold performance, provides a more positive lock and as noted above a smooth gripping force that is spread out over the widest possible area. Theoretically, the smaller the acute angle of the triangular bar and channel cavity, the greater the surface area of the major surfaces and therefore the greatest distribution of the gripping force.

A further object of the invention is to use the improved clamp assembly with a tensioning means which is part of a frame that interacts with the bar and clamp to tension the flexible material to the frame. The tensioning means consists of teeth or grooves on a frame wall that interact with teeth or grooves on the clamp to tension the flexible material to the frame while at the same time locking the flexible material within the clamp's triangular channel.

A further object of the invention is to use the improved clamp assembly with a C-channel tensioning receiver with teeth or grooves on the inside of one of its walls. The improved clamp assembly is provided with teeth or grooves on one of its external walls. The clamp assembly is inserted into the C-channel tensioning means with the clamp assembly's opening at the channel apex facing the closed end of the C-channel and the flexible material passing between the non-toothed C-channel wall and non-toothed clamp exterior surface. As the clamp and C-channel ratchet relative to one another, the flexible material becomes tensioned and locks the material within the clamp channel. As the clamp continues into the C-channel, the tensioned material causes the clamp to rotate and further clamp the flexible material between the C-channel wall and the external surface of the clamp thereby providing a second locking action on the flexible material.

BRIEF DESCRIPTION OF THE DRAWINGS

For a better understanding of the nature and the objects of the invention, reference should be had to the following detailed description, taken in connection with the accompanying drawings in which:

FIG. 4a illustrates an alternate method of wrapping the triangular bar shown in FIG. 4 using the wrapping method taught in FIG. 2a;

DETAILED DESCRIPTION OF THE PREFERRED EMBODIMENT

Figure 9:
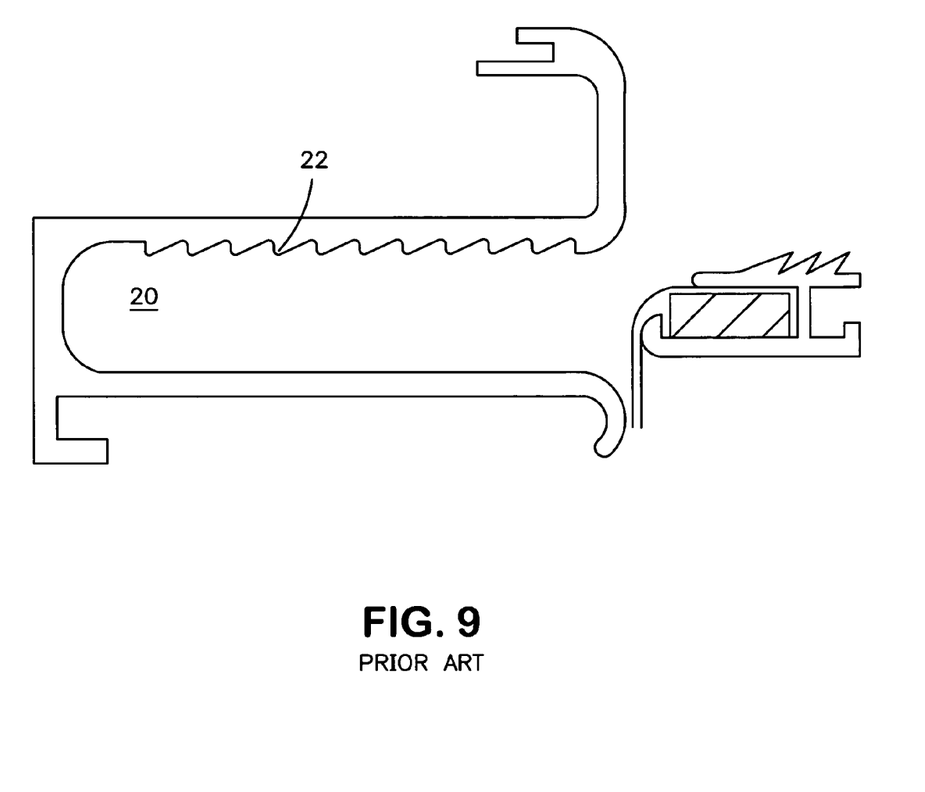
FIG. 9 illustrates a prior art bar and clamp tensioning assembly.

The subject of the present invention is an improvement to the tensioning assembly utilized in the Coleman U.S. Pat. No. 5,398,388 incorporated herein by reference. In the latter patent, a straight line ratchet is created by virtue of a formed receiver C-channel open area 20 with grooves or teeth 22, or a channel fitted with grooves may be incorporated as part of a sign embodiment or it may be provided as a part to attach to an existing sign embodiment or other structure. This prior art is shown in FIG. 9.

Figure 1:
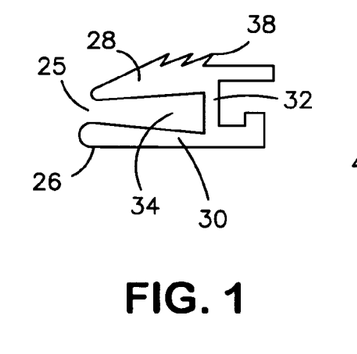
FIG. 1 illustrates a side view of a clamp with an internal triangular channel.
Figure 2:
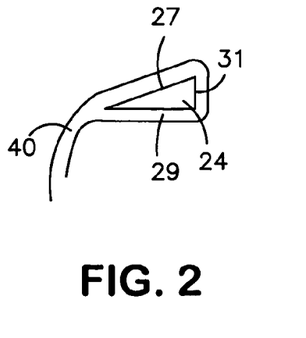
FIG. 2 illustrates a side view of a triangular bar wrapped with a flexible material to be clamped.
Figure 3:
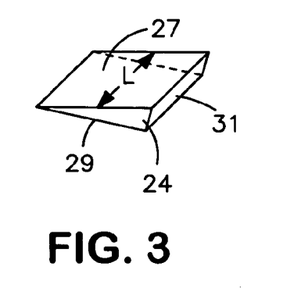
FIG. 3 illustrates a pictorial view of the triangular bar.

In place of the tensioning bar and clamp utilized in the above patent, the improved tensioning apparatus is made up of two parts as shown in FIGS. 1–3. The first part shown in FIGS. 2–3 consists in a tapered triangular bar 24, which has two major surfaces 27 and 29 meeting at an acute angle and a base 31. Although the figures show the edges as sharp, they also could be slightly rounded to protect the flexible material. The major surfaces 27 and 29 of the bar may be smooth or serrated with the latter providing an additional gripping property. The bar can be made of any material, however, extruded aluminum is usually employed. The bar is cut approximately 4" in length with a triangular cross section with the edges of the major surfaces 27 and 29 being of a length at least three times the height of the bar base. With this dimension of the bar, the major surfaces 27 and 29, which are used to grip the flexible material, make up approximately 90% of the bar's total surface area. Depending on its use, the bar could be cut to other lengths. The smaller the acute angle of the bar is made, the larger the gripping area of surfaces 27 and 29 will become.

The second part of the tensioning apparatus is rigid nonflexible tensioning clamp 26 formed with an upper arm 28 and a lower arm 30 separated nearer one end of the clamp by a spacer bar 32. At the other end of the tension clamp, the upper arm 28 and the lower arm 30 are formed so as to define between them a triangular channel 34 which, in one embodiment, is slightly larger than the triangular bar 24 but congruent to it. The major internal surfaces of the triangular channel may be smooth or serrated with the latter providing additional gripping property. Spacer bar 32 forms the base of this channel and an opening 25 is formed between the ends of arms 28 and 30 at the apex of the channel. In one embodiment this opening is sized to permit the passage of the flexible material but not the triangular bar, however, in other embodiments the opening could be large enough to permit the apex of the triangular bar to pass. Although it is preferred that the triangular channel 34 pass completely through the length of the clamp between arms 28 and 30, as an alternative, one side of the channel could be closed if desired.

Figure 4:
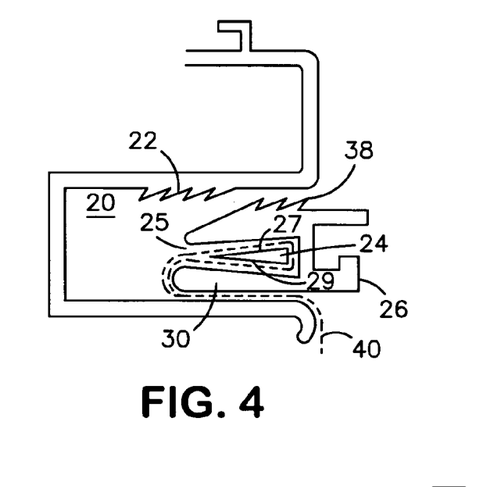
FIG. 4 illustrates the wrapped triangular bar assembled into the clamp triangular channel prior to insertion of the clamp into a C-channel receiving means.
Figure 5:
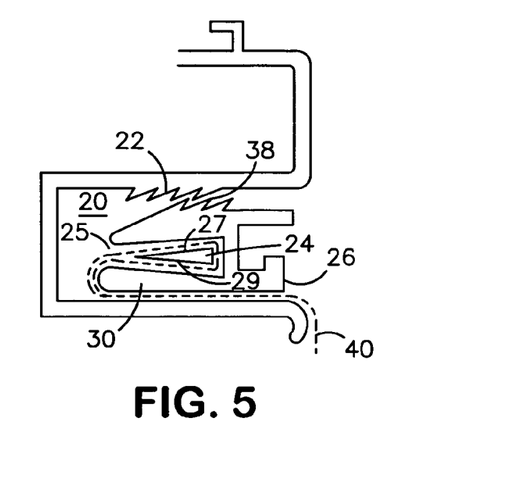
FIG. 5 illustrates the increasing tension in the flexible material pulling the wrapped triangular bar into locking engagement with the clamp's internal triangular channel walls as the clamp begins to move into the C-channel means.
Figure 6:
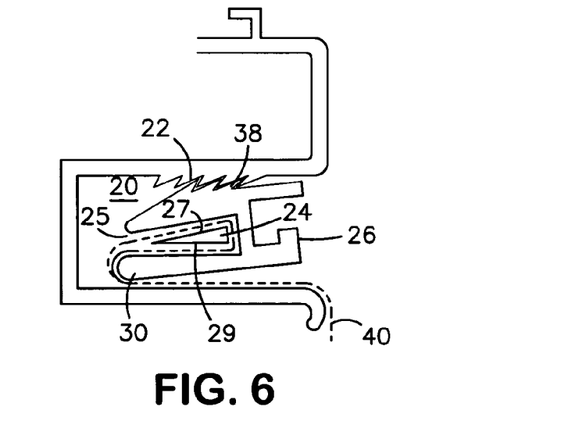
FIG. 6 illustrates the clamp, with the flexible material locked within its triangular channel, engaging its teeth with the C-channel teeth to rotate the clamp to further lock the flexible material between the bottom leg of the clamp and the C-channel wall.

The external surface of the clamp could have different shapes as long as it contains an internal triangular channel and an external opening into the channel apex. In the illustrated preferred embodiment, the upper arm 28 of the clamp is provided with two or three grooves or teeth 38 adjacent one end, which teeth are angled away from the channel opening 34. More teeth could be provided where a stronger grip is desired. As shown in FIGS. 4–6, the clamp has a thickness such that the clamp will be received in the receiver C-channel 20 tensioning means and, as it progresses into the C-channel, the teeth 38 of the clamp will engage the teeth 22 of the C-channel and lock the clamp in the receiver channel while at the same time tensioning the flexible material.

In tensioning a flexible material, for example a display face, an end portion 40 of the display face is wrapped around triangular bar 24, as seen in FIG. 2, with the end of the material overlapping the main body of the flexible material beyond the bar's apex. The wrapped bar is then inserted into the triangular channel 34 of the tensioning clamp 26 with the two overlapped layers of the flexible material 40 passing out of the triangular channel 34 through channel opening 25, see FIG. 4. Although FIG. 2 shows a clockwise wrapping, the direction of wrapping the flexible material about the bar can be either clockwise or counter clockwise.

Figure 2A:
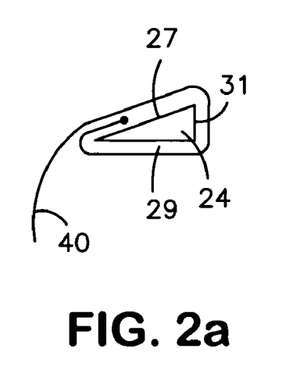
FIG. 2a illustrates a side view of a triangular bar with an alternate method of wrapping the bar.

As seen in FIG. 2a, an alternative method of wrapping the triangular bar is shown which would result in only a single layer of the flexible material exiting the channel apex as apposed to the two layers shown in FIG. 2.

Figure 4A:
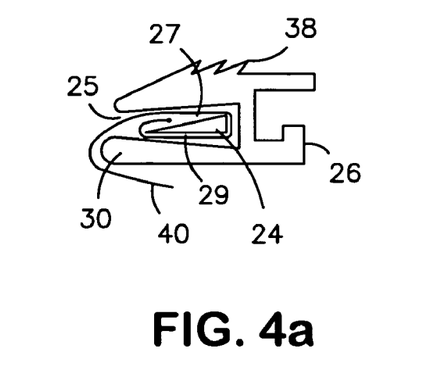

FIGS. 4 illustrates an end view of a sign frame with a wrapped triangular bar 24 assembled within the triangular channel 34 of the tensioning clamp 26 with the two overlapped layers of the flexible material 40 passing out of the clamp channel opening 25 and under the bottom leg 30 of the clamp 26 ready to be pushed into the C-channel 20 tensioning means of the frame. Note in the FIG. 4a embodiment, only a single layer of the flexible material would pass out of the clamp opening 25 and under the bottom leg 30 of the clamp. The teeth or grooves 38 of the tensioning clamp 26 will engage the teeth 22 of the C-channel as the clamp is pushed into the C-channel. As the clamp teeth begin to engage the C-channel teeth as seen in FIG. 5, the flexible material will begin to tighten across the frame. As the flexible material begins to tension, the wrapped triangular bar will be pulled toward the clamp channel opening 25 and the entire area of major surfaces 27 and 29 of bar 24 will immediately engage the congruent major surfaces of the clamp channel and evenly distribute the tensioning pressure on the flexible material, firmly securing or locking it between the bar and clamp channel. In view of the fact that the length of the triangular bar's major surfaces are at least three times the height of the bar's base, approximately 90% of the bar's surface area will clamp or lock the flexible material to the clamp channel surfaces. As the clamp teeth continue to ratchet with the C-channel teeth, the flexible material tension continues to increase as does the uniform distribution of this tensioning pressure through the wrapped triangular bar's major surfaces onto the congruent major surfaces of the clamp channel. As the clamp continues into the C-channel, the increased tension in the flexible material and the interaction of the clamp teeth and the C-channel teeth will cause the clamp to rotate downwardly, see FIG. 6, so that the outside edge of the bottom leg 30 of the tensioning clamp pivots about the lower C-channel wall and presses against the overlapped double layer of flexible material thereby locking it against the bottom portion of the C-channel. Note, if the FIG. 4a embodiment were employed, only a single layer of the flexible material would be locked between the clamp and the C-channel. This embodiment therefore provides a double clamping lock on the flexible material, first a lock between the triangular bar and clamp channel and then an additional second locking of the overlapped double layer of flexible material or, if FIG. 4a is used, a single layer of flexible material between the bottom leg of the clamp and C-channel wall.

In tensioning the flexible material sign to a frame, oppositely disposed tensioning clamps will engage opposite C-channel tensioning means portions of the sign, i.e., top and bottom and left side and right side. The further the tensioning clamp is forced into the C-channel, the tighter the covering will become.

Figure 7:
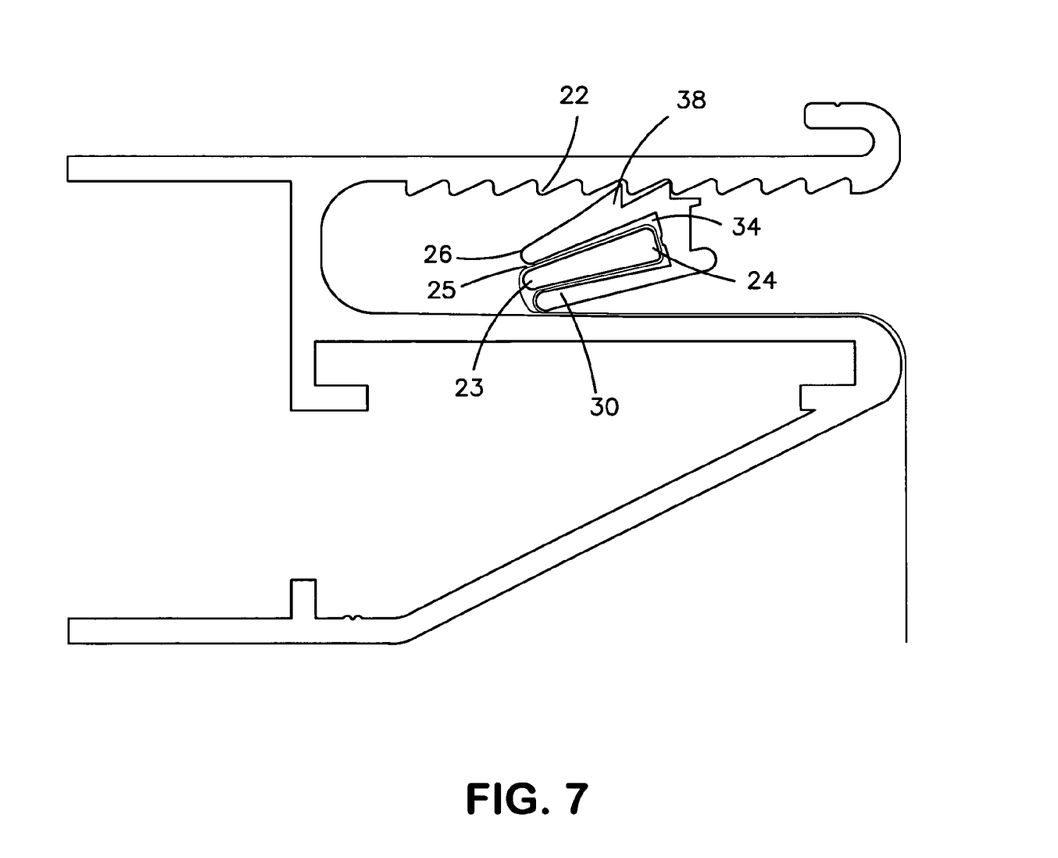
FIG. 7 illustrates a modified embodiment of the wrapped triangular bar and clamp assembly mounted in the C-channel with the apex of the triangular bar extending slightly beyond the apex of the clamp channel.

FIG. 7 illustrates an end view of an alternate embodiment of the sign frame with a wrapped triangular bar 24 inserted into the triangular channel 34 of the tensioning clamp 26. In this embodiment the triangular bar has rounded edges to protect the flexible material. The tensioning clamp 26 of this embodiment has the channel apex opening slightly wider to permit the apex of the wrapped triangular bar to extend slightly beyond the channel apex opening. Aside from the above difference, this embodiment functions in the same manner as the embodiment of FIGS. 4–6.

Figure 7A:
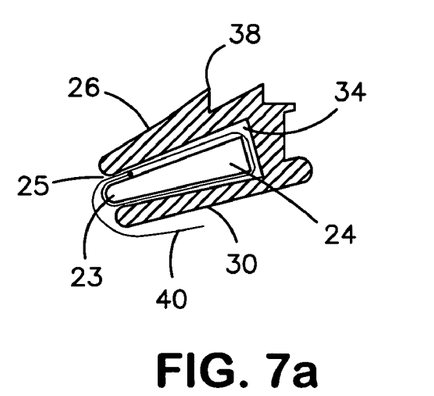
FIG. 7a illustrates an alternate method of wrapping the triangular bar of FIG. 7 using the wrapping method taught in FIG. 2.

FIG. 7a depicts an alternate version of FIG. 7 that uses an alternate method of wrapping the flexible material about the triangular bar. This method results in only a single layer of the flexible material exiting the channel apex and being clamped or locked between the clamp and the C-channel wall as opposed to the two layers clamping or locking of FIG. 7.

Figure 8:
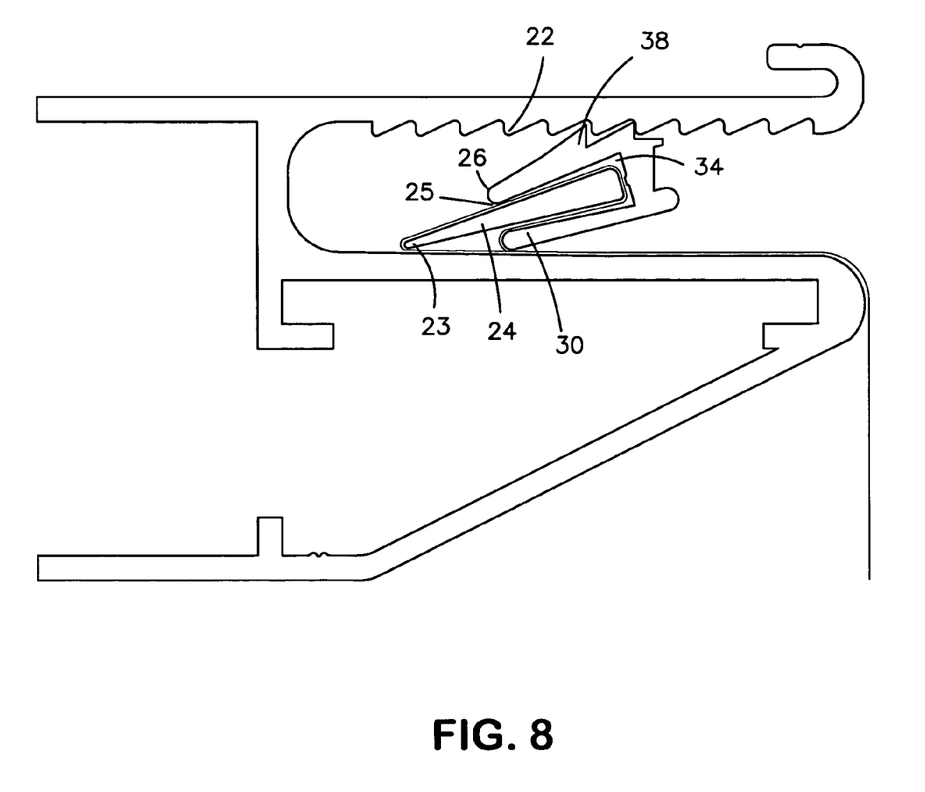
FIG. 8 illustrates a second modified embodiment of the wrapped triangular bar and clamp assembly mounted in the C-channel with the apex of the triangular bar extending beyond the apex of the channel and contacting the C-channel wall.

FIG. 8 illustrates an end view of a second alternate embodiment of the sign frame with a wrapped triangular bar 24 inserted into the triangular channel 34 of the tensioning clamp 26. In addition to having rounded edges, the triangular bar 24 of this embodiment is almost twice as long as the triangular clamp channel. The apex opening 25 of the clamp channel is wide enough to permit the triangular bar's apex 23 to extend well beyond the apex opening of the clamp channel. This embodiment functions in the same manner as the embodiments of FIGS. 4–7 in that as the clamp begins to ratchet into the C-channel frame the tension in the flexible material will first cause the triangular bar to wedge or lock the flexible material uniformly to the clamp channel wall. Also as the ratcheting continues, the tension in the flexible material will cause the clamp to rotate downwardly so that the outside edge of the bottom leg 30 of the tensioning clamp pivots about the lower C-channel wall and presses against the overlapped double layer of flexible material thereby locking it against the bottom portion of the C-channel. Furthermore as the clamp continues to pivot about the outside edge of the bottom leg 30, the wrapped apex 23 of the triangular bar 24 also presses a single layer of the flexible material against the lower C-channel wall and provides an additional third lock on the flexible material in addition to the second double layer fabric lock provided by the outer edge 30 of the clamp.

Figure 8A:
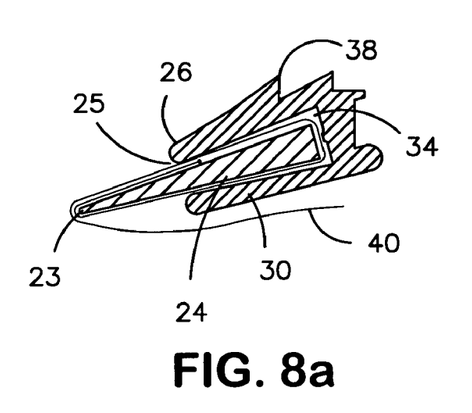
FIG. 8a illustrates an alternate method of wrapping the triangular bar of FIG. 8 using the wrapping method of FIG. 2.

FIG. 8a illustrates an alternate version of FIG. 8 in which the flexible material is wrapped about the triangular bar in such a way that only a single layer of the flexible material passes between the outer edge of clamp leg 30 and the C-channel wall and is locked thereto as opposed to the double layer locking of the FIG. 8 embodiment. In addition, in view of the manner in which the bar is wrapped, a double layer of the flexible material wraps about the apex of the bar. Therefore, upon contact with the C-channel wall, the apex of the bar will lock two layers of the flexible material to the C-channel as opposed to a single layer as in the FIG. 8 embodiment.

Removal of the tensioning clamps from the C-channels in the embodiments of FIGS. 4–8 is achieved by inserting a bar or special tool into the tensioning clamp to push it away from the grooves or teeth to disengage the ratchet. Once disengaged, the elastic action of the tensioned flexible material allows the assembly to pop out.

Although the means for tensioning discussed in the FIGS. 4–8 embodiments involved the ratcheting between the teeth on the C-channel and the clamp, the tensioning means could employ other forms of linear ratcheting other than the preferred C-channel embodiment.

I claim:

1. A flexible material clamp assembly comprising:
    a triangular bar having a base and two major inclined surfaces meeting at an acute angle, the length of the major surfaces being at least three times the height of the base and representing approximately 90% of the bar's surface area;
    a clamp having an internal triangular channel slightly larger than the triangular bar but congruent to it, one end of said clamp having an opening into an apex of the channel and at least one side of the clamp being open to the triangular channel;
    one end of the flexible material being wrapped about said triangular bar and overlapped upon itself, said wrapped bar being inserted into said channel through said at least one open side of the clamp with the flexible material passing through the clamp opening at the apex of the channel; and
    tensioning means for causing the clamp and bar to move relative to one another to thereby firmly lock the flexible material between the major surfaces of the triangular bar and the corresponding major surfaces of the triangular channel thereby locking the flexible material in the channel.

2. A flexible material clamp as in claim 1, wherein the major surfaces of the triangular bar are serrated.

3. A flexible material clamp as in claim 1, wherein the major surfaces of the clamp channel are serrated.

4. A flexible material clamp as in claim 1, wherein both sides of the clamp are open to the triangular channel.

5. The flexible material clamp assembly as set forth in claim 1, wherein said tensioning means comprises:
a receiver C-channel having serrated edges or teeth along one parallel wall of the C-channel, said edges or teeth facing in a direction of a closed end portion of the C-channel;
one exterior surface of said clamp including grooves;
said clamp being inserted into said C-channel with the serrated edges or teeth of the C-channel and the grooves of the clamp interacting with one another to thereby tension the flexible material and cause the triangular bar to move toward the apex of the clamp channel and lock the flexible material between the major surfaces of the bar and the corresponding major surfaces of the channel.

6. The flexible material clamp as in claim 5, wherein said flexible material passes through the clamp opening at the apex of the channel and passes between a non serrated C-channel parallel wall and a smooth exterior surface of the clamp whereby as the clamp extends further into the C-channel, the tension in the flexible material and the interaction of the grooves and serrations causes the clamp to rotate with the smooth surface of the clamp pivoting on the non serrated C-channel wall further locking at least one layer of the flexible material to the non serrated C-channel wall thereby resulting in a second lock on the flexible material.

7. The flexible material clamp as in claim 6, wherein the flexible material passing through the clamp opening at the apex of the channel and passing between the non serrated C-channel wall and the exterior surface of the clamp consists of two overlapped layers of the flexible material and wherein the pivoting clamp locks these two layers of the flexible material to the non serrated C-channel wall to create the second lock.

8. A tensioning receiver in combination with a flexible material gripping assembly for tensioning a flexible material, said tensioning receiver comprising:
a receiver C-channel having upper and lower parallel arms which extend to a closed end portion of the C-channel, one of said arms includes serrated edges or teeth on its inner side, said edges facing in the direction of a closed end portion of the C-channel;
said flexible material gripping assembly comprising:
a triangular bar having a base and two major inclined surfaces meeting at an acute angle, the length of the major surfaces being at least three times the height of the base;
a clamp having an upper arm and a lower arm separated nearer one end of the clamp by a spacer;
at the other end of the clamp the upper arm and the lower arm are shaped so as to define between them an internal triangular channel slightly larger than the triangular bar but congruent to it, with the opening between ends of the upper and lower arms into an apex of the channel;
one of said arms of said clamp includes grooves in on its outer side;
one end of the flexible material is wrapped about said triangular bar and overlapped upon itself, said wrapped bar being inserted into said channel through at least one open side of the clamp with the flexible material passing through the clamp opening at the apex of the channel;
and said clamp with the enclosed wrapped triangular bar being inserted into the receiver C-channel, the engagement of the clamp grooves and the C-channel teeth producing an initial tension in the flexible material causing movement of the triangular bar to firmly lock the flexible material between the sides of triangular bar and the congruent walls of the triangular channel thereby locking the flexible material in the channel;
and further insertion of the clamp into the C-channel causing the grooves of the clamp to interact with the teeth on the C-channel to further tension the flexible material and retain the clamp within the C-channel.

9. The tensioning receiver of claim 8, wherein said clamp opening faces the closed end of the C-channel and said flexible material passing through the clamp opening at the apex of the channel also passing between the non serrated arm of the C-channel and the non grooved arm of the clamp whereby as the clamp extends further into the C-channel, the tension in the flexible material and the interaction of the grooves and teeth cause the clamp to rotate with the non grooved arm of the clamp pivoting on the non serrated C-channel wall locking at least one layer of the flexible material between the clamp and the non serrated arm of the C-channel thereby resulting in a second lock on the flexible material.

10. The flexible material clamp as in claim 9, wherein the flexible material passing through the clamp opening at the apex of the channel consists of two overlapped layers of the flexible material and wherein the pivoting clamp locks these two layers of the flexible material to the non serrated C-channel wall to create the second lock.

11. A flexible material tensioning system comprising:
a receiving channel having upper and lower arms, one arm containing internal grooves or teeth;
a clamp assembly having upper and lower arms, one arm having grooves or teeth to interact with the grooves or teeth on the one arm of the channel, said clamp assembly having an internal channel having a base and two sloping walls, said channel also having an external opening at the apex of said sloping walls;
a triangular bar having a base and two sloping surfaces wrapped with a marginal end of said flexible material such that the marginal end overlaps upon itself;
said wrapped triangular bar being inserted into said clamp channel through at least one open side of the clamp assembly with the flexible material extending through the external opening at the apex of the clamp channel and passing around the non grooved arm of the clamp assembly, said sloping channel walls being congruent to the surfaces of the triangular bar within the channel;
said assembled wrapped triangular bar and clamp assembly being inserted into said receiving channel such that the teeth or grooves of the clamp assembly and receiving channel ratchet relative to each other, such ratcheting causing the flexible material to tension which causes the triangular bar to securely wedge and lock the flexible material against the sloping walls of said clamp internal channel and further ratcheting causing the clamp assembly to pivot in the receiving channel about an outside edge of a non grooved arm of said clamp assembly, which pivoting causes at least one layer of the flexible material to be locked between the outside edge of the clamp assembly and the arm of the receiving channel thereby creating a second lock on the tensioned material.

12. A flexible material tensioning system as set forth in claim 11, wherein said clamp internal channel is a triangular channel slightly larger than the triangular bar, said wrapped triangular bar completely contained within the clamp channel.

13. A flexible material tensioning system as set forth in claim 12, wherein the flexible material passing through the clamp opening at the apex of the channel consists of two overlapped layers of the flexible material and wherein the pivoting clamp locks these two layers of the flexible material between the outside edge of the clamp assembly and the receiving channel arm to create the second lock.

14. A flexible material tensioning system as set forth in claim 11, wherein the apex of said triangular bar extends through the external opening at the apex of the channel.

15. A flexible material tensioning system as set forth in claim 14, wherein the flexible material passing through the clamp opening at the apex of the channel consists of two layers of the flexible material and wherein the pivoting clamp locks these two layers of the flexible material between the outside edge of the clamp assembly and the receiving channel arm to create the second lock.

16. A flexible material tensioning system as set forth in claim 15, wherein, when the clamp assembly pivots within the receiving channel, an apex of the triangular bar contacts the receiving channel arm thereby further locking one of the layers of the flexible material passing through the apex of the channel between the bar apex and the receiving channel arm thereby creating a third lock on the flexible material.

17. A flexible material tensioning system as set forth in claim 14, wherein, said wrapped triangular bar contains a double layer of the flexible material at an apex of the bar such that when the assembly clamp pivots within the receiving channel, the double layer on the apex of the triangular bar contacts the receiving channel arm further locking the double layer of the flexible material between the bar apex and the receiving channel wall thereby creating a third lock on the flexible material.

18. A flexible material tensioning system as set forth in claim 11, wherein the sloping surfaces of the triangular bar are serrated.

19. A flexible material tensioning system as set forth in claim 11, wherein the sloping walls of the channel are serrated.

20. A flexible material tensioning system as set forth in claim 11, wherein at least one side of the clamp assembly channel is open to permit insertion of the wrapped triangular bar.

* * * * *